(12) United States Patent
Fordyce, III

(10) Patent No.: US 10,115,112 B2
(45) Date of Patent: Oct. 30, 2018

(54) TRANSACTION EVALUATION FOR PROVIDING REWARDS

(75) Inventor: Edward W. Fordyce, III, Hagerstown, IN (US)

(73) Assignee: Visa U.S.A. Inc., San Francisco, CA (US)

(*) Notice: Subject to any disclaimer, the term of this patent is extended or adjusted under 35 U.S.C. 154(b) by 2425 days.

(21) Appl. No.: 11/835,100

(22) Filed: Aug. 7, 2007

(65) Prior Publication Data

US 2008/0059303 A1 Mar. 6, 2008

Related U.S. Application Data

(60) Provisional application No. 60/824,268, filed on Aug. 31, 2006, provisional application No. 60/824,275, (Continued)

(51) Int. Cl.
| | |
|---|---|
| *G06Q 30/00* | (2012.01) |
| *G06Q 30/02* | (2012.01) |
| *G06Q 40/00* | (2012.01) |

(52) U.S. Cl.
CPC ......... *G06Q 30/02* (2013.01); *G06Q 30/0207* (2013.01); *G06Q 30/0223* (2013.01); (Continued)

(58) Field of Classification Search
CPC ........... G06Q 30/0207; G06Q 30/0208; G06Q 30/0223; G06Q 30/0229; G06Q 30/0238; (Continued)

(56) References Cited

U.S. PATENT DOCUMENTS

| | | |
|---|---|---|
| 4,751,374 A | 6/1988 | Nose |
| 5,025,372 A | 6/1991 | Burton et al. |

(Continued)

FOREIGN PATENT DOCUMENTS

| | | |
|---|---|---|
| CA | 2680531 | 9/2008 |
| WO | 2001045008 | 6/2001 |

OTHER PUBLICATIONS

International Patent Application PCT/US07/77039, International Preliminary Report on Patentability, dated Dec. 25, 2008.

(Continued)

*Primary Examiner* — Raquel Alvarez
(74) *Attorney, Agent, or Firm* — The Webb Law Firm

(57) ABSTRACT

An amount of loyalty program currency is pre-selected by a consumer and exchanged for a corresponding value-added reward also pre-selected by the consumer. The pre-selected reward, which can be a value added back to the consumer payment device, is given when the consumer conducts their pre-selected transaction using their consumer payment device. The amount of the loyalty program currency can be added back to the consumer payment device, and later exchanged for the consumer pre-selected value-adding rewards, by the consumer's transactional use of their consumer payment device. Consumer pre-selected value-added rewards, for instance, can appear as statement credits to an account associated with the consumer payment device. As such, an incentive exists for the consumer to pre-select a transaction to conduct with their consumer payment device to realize a corresponding pre-selected statement credit for such loyal use of their consumer payment device.

13 Claims, 7 Drawing Sheets

Related U.S. Application Data filed on Aug. 31, 2006, provisional application No. 60/824,426, filed on Sep. 1, 2006.

(52) U.S. Cl.
CPC ..... *G06Q 30/0226* (2013.01); *G06Q 30/0234* (2013.01); *G06Q 30/0238* (2013.01); *G06Q 30/0239* (2013.01); *G06Q 40/00* (2013.01)

(58) Field of Classification Search
CPC ........... G06Q 30/0239; G06Q 30/0234; G06Q 30/0226; G06Q 30/02; G06Q 40/00
USPC ............. 705/14.1, 14.11, 14.23, 14.27, 14.3, 705/14.38, 14.39, 14.34
See application file for complete search history.

(56) References Cited

U.S. PATENT DOCUMENTS

| | | | |
|---|---|---|---|
| 5,471,669 A | 11/1995 | Lidman | |
| 5,495,412 A | 2/1996 | Thiessen | |
| 5,689,100 A | 11/1997 | Carrithers et al. | |
| 5,734,838 A | 3/1998 | Robinson et al. | |
| 5,855,008 A | 12/1998 | Goldhaber et al. | |
| 5,945,653 A | 8/1999 | Walker et al. | |
| 6,009,411 A | 12/1999 | Kepecs | |
| 6,014,635 A | 1/2000 | Harris et al. | |
| 6,061,660 A | 5/2000 | Eggleston et al. | |
| 6,105,001 A | 8/2000 | Masi et al. | |
| 6,222,914 B1 | 4/2001 | McMullin | |
| 6,332,126 B1 | 12/2001 | Pierce et al. | |
| 6,405,174 B1* | 6/2002 | Walker et al. | 705/14.21 |
| 6,694,300 B1 | 2/2004 | Walker et al. | |
| 6,876,971 B1 | 4/2005 | Burke | |
| 6,937,995 B1 | 8/2005 | Kepecs | |
| 6,965,868 B1 | 11/2005 | Bednarek | |
| 7,219,071 B2 | 5/2007 | Gallagher | |
| 7,318,049 B2 | 1/2008 | Iannacci | |
| 7,392,224 B1 | 6/2008 | Bauer et al. | |
| 7,398,225 B2* | 7/2008 | Voltmer et al. | 705/14.27 |
| 7,433,845 B1 | 10/2008 | Flitcroft et al. | |
| 7,490,058 B2 | 2/2009 | Dan et al. | |
| 7,665,660 B2 | 2/2010 | Degliantoni et al. | |
| 7,680,688 B2 | 3/2010 | Hessburg et al. | |
| 7,686,218 B2 | 3/2010 | Hessburg et al. | |
| 7,828,206 B2 | 11/2010 | Hessburg et al. | |
| 7,844,490 B2 | 11/2010 | Patterson | |
| 8,046,256 B2 | 10/2011 | Chien et al. | |
| 8,103,545 B2 | 1/2012 | Ramer et al. | |
| 8,620,738 B2 | 12/2013 | Fordyce, III et al. | |
| 8,751,295 B2 | 6/2014 | Tiku et al. | |
| 8,781,893 B2* | 7/2014 | Walker et al. | 705/14.17 |
| 2001/0054003 A1* | 12/2001 | Chien et al. | 705/14 |
| 2002/0002533 A1 | 1/2002 | Singhal | |
| 2002/0013765 A1 | 1/2002 | Shwartz | |
| 2002/0077969 A1 | 6/2002 | Walker et al. | |
| 2002/0120588 A1 | 8/2002 | Preist et al. | |
| 2002/0143626 A1* | 10/2002 | Voltmer et al. | 705/14 |
| 2003/0028451 A1 | 2/2003 | Ananian | |
| 2003/0033211 A1 | 2/2003 | Haines et al. | |
| 2003/0088462 A1 | 5/2003 | Carrithers et al. | |
| 2003/0130895 A1 | 7/2003 | Antonucci et al. | |
| 2003/0149623 A1 | 8/2003 | Chen | |
| 2003/0216967 A1 | 11/2003 | Williams | |
| 2004/0019522 A1 | 1/2004 | Bortolin et al. | |
| 2004/0068435 A1 | 4/2004 | Braunzell | |
| 2004/0133504 A1 | 7/2004 | Dalal | |
| 2004/0210481 A1 | 10/2004 | Quinlan et al. | |
| 2004/0215543 A1 | 10/2004 | Betz et al. | |
| 2004/0254848 A1 | 12/2004 | Golan et al. | |
| 2005/0004836 A1 | 1/2005 | Ruttenberg | |
| 2005/0004839 A1 | 1/2005 | Bakker et al. | |
| 2005/0010470 A1 | 1/2005 | Marino | |
| 2005/0021399 A1 | 1/2005 | Postrel | |
| 2005/0021400 A1 | 1/2005 | Postrel | |
| 2005/0071227 A1 | 3/2005 | Hammad et al. | |
| 2005/0109833 A1 | 5/2005 | Page | |
| 2005/0177750 A1 | 8/2005 | Gasparini et al. | |
| 2005/0203966 A1 | 9/2005 | Labrou et al. | |
| 2005/0267842 A1 | 12/2005 | Weichert et al. | |
| 2005/0289001 A1 | 12/2005 | Parnau | |
| 2006/0000900 A1 | 1/2006 | Fernandes et al. | |
| 2006/0111978 A1 | 5/2006 | Tietzen et al. | |
| 2006/0195359 A1 | 8/2006 | Robinson | |
| 2006/0208064 A1 | 9/2006 | Mendelovich et al. | |
| 2006/0208065 A1 | 9/2006 | Mendelovich et al. | |
| 2006/0224454 A1 | 10/2006 | Kantor et al. | |
| 2006/0253320 A1 | 11/2006 | Heywood | |
| 2006/0253321 A1 | 11/2006 | Heywood | |
| 2007/0001016 A1 | 1/2007 | Hunter, Jr. et al. | |
| 2007/0005427 A1 | 1/2007 | Walker et al. | |
| 2007/0022007 A1 | 1/2007 | Lawe | |
| 2007/0022048 A1 | 1/2007 | Kingsborough et al. | |
| 2007/0094080 A1 | 4/2007 | Wiken | |
| 2007/0150352 A1 | 6/2007 | Kelly-Frank et al. | |
| 2007/0185821 A1 | 8/2007 | Wells et al. | |
| 2007/0214049 A1 | 9/2007 | Postrel | |
| 2007/0255653 A1 | 11/2007 | Tumminaro et al. | |
| 2007/0265934 A1 | 11/2007 | Hassman et al. | |
| 2008/0010154 A1 | 1/2008 | Tietzen et al. | |
| 2008/0059302 A1 | 3/2008 | Fordyce, III | |
| 2008/0059306 A1 | 3/2008 | Fordyce, III | |
| 2008/0059307 A1 | 3/2008 | Fordyce, III | |
| 2008/0114657 A1 | 5/2008 | Forzley | |
| 2008/0133350 A1 | 6/2008 | White et al. | |
| 2008/0133351 A1 | 6/2008 | White et al. | |
| 2008/0154676 A1 | 6/2008 | Suk | |
| 2008/0228563 A1 | 9/2008 | Zellner et al. | |
| 2008/0228582 A1 | 9/2008 | Fordyce, III | |
| 2009/0006203 A1 | 1/2009 | Fordyce, III | |
| 2009/0089194 A1 | 4/2009 | Mathis et al. | |
| 2009/0171778 A1 | 7/2009 | Powell | |
| 2009/0259560 A1 | 10/2009 | Bachenheimer | |
| 2010/0169170 A1 | 7/2010 | Fordyce, III | |
| 2011/0004514 A1 | 1/2011 | Thomas | |
| 2012/0311617 A1* | 12/2012 | Walker et al. | 725/5 |
| 2014/0257919 A1* | 9/2014 | Forman | G06Q 30/0201 705/7.29 |
| 2015/0134528 A1 | 5/2015 | Fineman et al. | |

OTHER PUBLICATIONS

International Patent Application PCT/US07/77039, International Search Report and Written Opinion, dated Aug. 25, 2008.
International Patent Application PCT/US07/77285, International Preliminary Report on Patentability, dated Apr. 2, 2009.
International Patent Application PCT/US07/77285, International Search Report and Written Opinion, dated Feb. 26, 2008.
International Patent Application PCT/US07/77440, International Search Report and Written Opinion, dated Feb. 11, 2008.
International Patent Application PCT/US07/77447, International Search Report and Written Opinion, dated Jun. 25, 2008.
International Patent Application PCT/US08/57128, International Search Report and Written Opinion, dated Jul. 17, 2008.
International Patent Application PCT/US08/61890, International Search Report and Written Opinion, dated Sep. 22, 2008.
Saranow, Jennifer et al., Proclamation Points Reward!: For Spending Cash at Dealership or Using Automaker's Credit Card Accumulate Points and Use Toward Services or Vehicle Purchase, Chicago Sun-Times, p. A60, Jun. 4, 2006.
Title: Merchant Offer Program, U.S. Appl. No. 12/604,322, filed Oct. 22, 2009, Inventor(s): Edward Fordyce, et al., Non Final Action dated Jun. 4, 2014.
Title: Loyalty Program Serice, U.S. Appl. No. 11/767,202, filed Jun. 22, 2007, Inventor(s): Edward Fordyce III, et al, Non Final Action dated Sep. 9, 2014.
Title: Loyalty Program Incentive Determination, U.S. Appl. No. 11/848,112, filed Aug. 30, 2007, Inventor(s): Edward Fordyce, et al, U.S. Pat. No. 8,620,738, Issue Date: Dec. 31, 2013.
Title: Loyalty Program Parameter Collaboration, U.S. Appl. No. 11/848,179, filed Aug. 30, 2007, Inventor(s): Edward Fordyce III, et

(56) References Cited

OTHER PUBLICATIONS al, Status: Docketed New Case—Ready for Examination, Status Date: Jul. 22, 2014.
Title: Payment Account Processing Which Conveys Financial Transaction Data and Non Financial Transaction Data, U.S. Appl. No. 12/110,914, filed Apr. 28, 2008, Inventor(s): Edward Fordyce, et al, Status: Docketed New Case—Ready for Examination, Status Date: Aug. 6, 2014.
Title: Loyalty Program for Merchant Inventory, U.S. Appl. No. 12/048,177, filed Mar. 13, 2008, Inventor(s): Edward Fordyce, et al, Status: Examiner's Answer to Appeal Brief Mailed, Staus Date: Oct. 1, 2014.
Title: Merchant Offer Program, U.S. Appl. No. 12/604,322, filed Oct. 22, 2009, Inventor(s): Edward Fordyce, et al, Non Final Action dated Dec. 31, 2014.
Title: Systems and Methods to Facilitate the Redemption of Offer Benefits in a Form of Third Party Statement Credits, U.S. Appl. No. 14/538,121, filed Nov. 11, 2014, Inventor(s): Daniel Fineman, et al, Status: Docketed New Case—Ready for Examination, Status Date: Jan. 29, 2015.

* cited by examiner

400

> Receive from a merchant compensation for offering to a consumer-loyalty program participant a lower quantity of the loyalty program points that are exchangeable for the monetary loyalty program reward when the consumer payment device having the corresponding account is used to conduct one said qualifying transaction with the merchant, wherein the compensation corresponds to the difference between a normal quantity of the loyalty program points that are exchangeable for the monetary loyalty program reward and the lower quantity of loyalty program points exchangeable for the monetary loyalty program reward

TRANSACTION EVALUATION FOR PROVIDING REWARDS

CROSS REFERENCE

This application claims priority to and the benefit of: U.S. Provisional Patent Application Ser. No. 60/824,268 (entitled "Transaction Evaluation For Providing Rewards", filed Aug. 31, 2006), the entire contents of which is hereby incorporated by reference; U.S. Provisional Patent Application Ser. No. 60/824,275 (entitled "Loyalty Programs and Services", filed Aug. 31, 2006), the entire contents of which is hereby incorporated by reference; and U.S. Provisional Patent Application Ser. No. 60/824,426 (entitled "Method and System for Loyalty Programs and Services", filed Sep. 1, 2006), the entire contents of which is hereby incorporated by reference.

FIELD

The present invention generally relates to consumer loyalty programs, and more particularly to a loyalty program that rewards a consumer for loyal use of a consumer payment device used by the consumer to conduct transactions.

BACKGROUND

A loyalty program provides a consumer with an incentive to conduct a transaction with a consumer payment device. Typically, consumers are rewarded incentives under a loyalty program when they perform transactions with merchants that are participating in the loyalty program. The incentives may typically be redeemed instantly or at a later time.

Many rewards for loyalty programs associated with cards offer "cash back" as a redemption item, which is usually fulfilled either as a check drawn on a bank that is sent to the account holder (such as a cardholder) who may then cash the check. Alternatively, the reward might be in the form of a gift card that can be used by its recipient for future transactions to purchase goods and services. Both of these loyalty program system of rewards are expensive to administer and do not reinforce the value of the relationship between the card, the card holder, and the entity that is issuing the reward to the card holder. Alternatively, some card loyalty programs offer a cash back option, which is fulfilled as a statement credit toward an account of the account holder. However, such a statement credit is not tied to a particular corresponding transaction (such as a corresponding transaction with a particular merchant, a category of merchants, or a particular industry).

Issuers of consumer payment devices (for instance, credit cards) and loyalty program providers would benefit from more cost effective ways of fulfilling cash back rewards or discounts, where the rewards will preferably reinforce the value of the consumer payment device as the earning mechanism. Issuers of consumer payment devices, loyalty program providers, and others (for instance merchants) would thereby benefit from new and innovative ways to deliver rewards or discounts through transactions that can differentiate among particular transactions and merchants, as well as among categories or industry of merchants, card issuers, and other participants.

SUMMARY

A loyalty program exchanges an amount of loyalty program currency for a reward to a consumer for use of a consumer payment device to conduct a transaction. The consumer pre-selects: (i) the reward that is to be added to their consumer payment device; (ii) the transaction that is to be conducted with their consumer payment device; and (iii) the amount of the loyalty program currency that is to be exchanged for the reward that the consumer has pre-selected. The currency of the loyalty program can be earned, and later exchanged for the pre-selected rewards, by the consumer's use of their consumer payment device for the pre-selected transaction.

The loyalty program can be implemented in a payment system in which the consumer is an account holder. The loyalty program provides a reward to the account holder in exchange for their loyalty. To be rewarded, the account holder pre-selects a transaction, and a corresponding discount, for which the account holder wants to receive the discount as a reward. When the account holder uses their account in the payment system to conduct their pre-selected transaction with a merchant, the account holder will be rewarded with the discount. The transaction can be processed by a transaction handler. In such a payment system, the account holder can be issued an account by an issuer. The transaction handler and/or the issuer define a business rule for those transactions that can be pre-selected by the account holder that qualify for a loyalty program reward. When the account holder conducts a transaction they've pre-selected that qualifies for a loyalty program reward, a redemption event can be identified. This identification, for instance, can be implemented by the issuer providing a redemption file to the transaction handler. The transaction handler, using the redemption file, can identify those transactions conducted by the account holder that are redemption events. Each such redemption event can be formed into a transaction record. Each such record can be processed as a corresponding statement credit that the issuer posts to an account of the account holder. For instance, the statement credit can be the reward that was pre-selected by the account holder for the transaction that was also pre-selected by The currency of the loyalty program can be points, discounts, or other currency types (e.g.; monetary, non-monetary, or both) the reward of which will be likely to provide an incentive to an account holder to use their account to engage in a desirable consumer behavior.

BRIEF DESCRIPTION OF THE DRAWINGS

The present invention is described in the context of the appended drawing figures, where like numerals designate like elements:

FIG. 4 is a flowchart illustrating an exemplary method by which a merchant or manufacturer may pre-arrange for their brand of goods or services to have a higher reward and/or a lower currency cost to a consumer participating in a loyalty program by making a pre-arrangement with a provider of the loyalty program provider to compensate the loyalty program provider for this accommodation by, in effect, 'buying down' the participation cost to the consumer;

DETAILED DESCRIPTION

Figure 1:
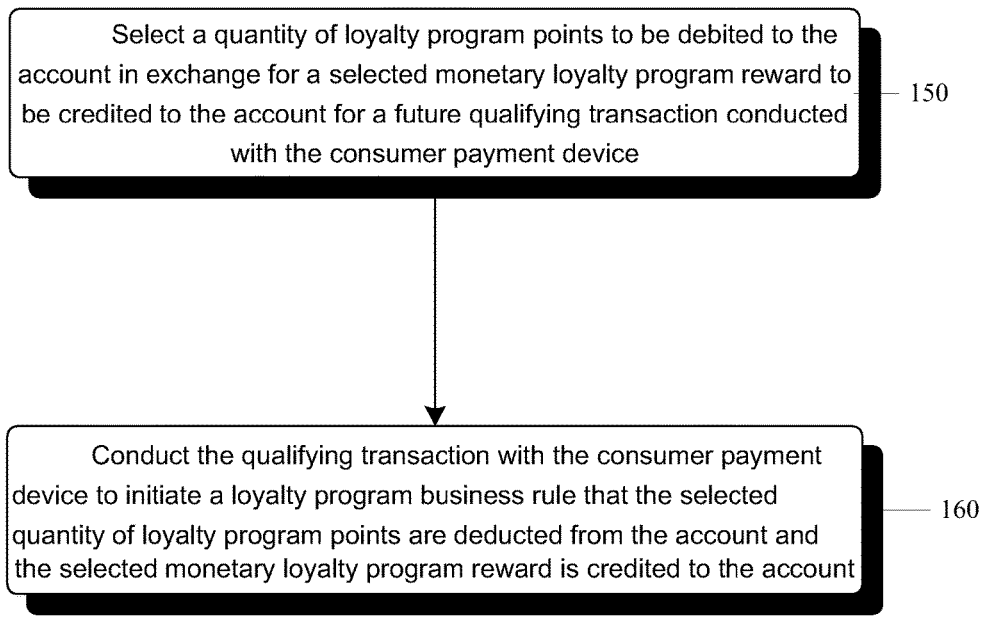
FIG. 1 is a flowchart illustrating an exemplary method by which a consumer can participate in a loyalty program.

A loyalty program is disclosed that rewards a consumer for using their consumer payment device to conduct a transaction. The consumer pre-selects the transaction that exchanges a pre-selected number of loyalty program points for a reward that is also pre-selected by the consumer. The consumer payment device can be a credit card, a stored value card, a debit card, a token associated with an account in a payment system for the consumer, and the like. In some implementations, the loyalty program points to be exchanged for the consumer pre-selected reward might have been previously earned by the consumer from use of their consumer payment device to conduct transactions for various goods and services.

In one implementation, a consumer participates in a loyalty program by compliance with certain business rules for the program, some which will preferably require that the consumer use their consumer payment device that is associated with an account, where such use means that the consumer is conducting transactions to buy goods and/or services with their consumer payment device. Prior to a reward transaction being conducted, the consumer pre-selects a quantity of loyalty program currency (i.e.; loyalty points) to be debited from their account in exchange for a pre-selected monetary loyalty program reward to be credited to their account for a future qualifying pre-selected transaction that is to be conducted with the consumer payment device, as shown in step 150 of method 100 seen in FIG. 1.

After the consumer makes the selection, the consumer conducts the pre-selected qualifying transaction with the consumer payment device to initiate a loyalty program business rule. The loyalty program business rules ensure that the selected quantity of loyalty program currency will be deducted from (credited against) the account, and that the selected monetary loyalty program reward will be added to (debited to) the account, as shown in step 160 of method 100 seen in FIG. 1.

In one implementation, the reward that was pre-selected by the consumer to be debited to their account will take the form of a discount that will be applied to the purchase price that is being paid by the consumer at a point of service terminal at the time that they conduct their pre-selected transaction by using their consumer purchase device. As such, they receive the reward immediately upon their conducting their pre-selected transaction at the point of service terminal. A paper receipt given to the consumer for their pre-selected transaction can be printed at the point of service terminal to memorialize their pre-selected transaction while also providing notice to the consumer of the reward they have 'instantly received' because of their loyal use of their consumer payment device.

Upon seeing the reward that has been added to their account, either at the time of the transaction or upon the statement for the consumer's account, the consumer readily recognizes the incentive to be a loyal user of their consumer payment device for future pre-selected purchases of goods and/or services. As such, the recognition is directly made by the consumer to the consumer payment device, and thus enhances loyalty to the issuer(s) of the consumer payment device.

The above loyalty program described with respect to FIG. 1 can give points to the consumer as they use their consumer payment device. These points can be added back to the account corresponding to the consumer payment device. The points added to the account can later be exchanged for the consumer pre-selected adding rewards by the consumer using their consumer payment device to conduct a transaction that is also pre-selected by the consumer. Each consumer pre-selected reward can appear, for instance, as a statement credit to the consumer's account that is associated with their consumer payment device. As such, the consumer has an incentive to pre-select a transaction to conduct with their consumer payment device to realize a corresponding pre-selected statement credit for such loyalty.

Figure 2:
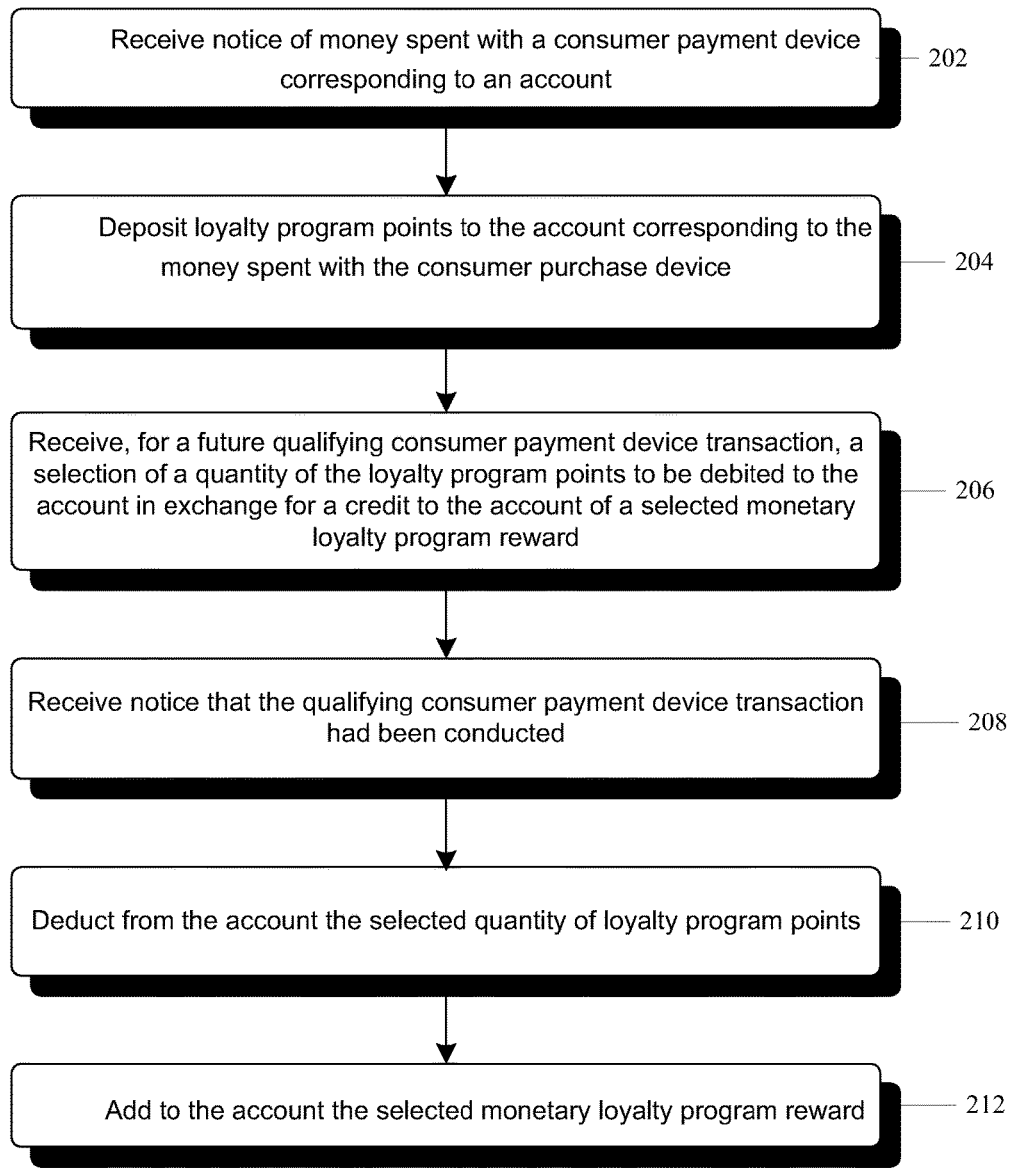
FIG. 2 is a flowchart illustrating an exemplary method of providing a loyalty program to a consumer who is a participant in the loyalty program.

Yet another implementation of a loyalty program is seen by steps 202 through 212 in a method 200 of FIG. 2. At steps 202-204, a consumer can receive a notice that their account has been debited with a number of loyalty program points that correspond to money that the consumer has spent in one or more transactions by using their consumer payment device. After the consumer has used the consumer payment device to conduct their transaction at step 208 that was pre-selected at step 206, the consumer can receive a notice that the pre-selected quantity of loyalty program points has been deducted from their account as seen in step 210, and that the selected monetary loyalty program reward has been credited to their account at step 212. Upon such notice, the consumer will readily recognize the value of being a loyal user of their consumer payment device by virtue of the association of the rewards with their consumer payment device. As such, the consumer has an incentive to pre-arrange rewards for future consumer purchase device transactions in exchange for the loyalty program points that they have earned by using the consumer purchase device.

In some implementations, a consumer can pre-select points to be exchanged for a reward upon conducting a future qualifying consumer payment device transaction. Such selections could be made, such as is seen at step 206 in FIG. 2, by inputting data corresponding to the transaction to a user interface associated with a computing device in communication with a network. For instance, an Internet website might allow the consumer to make a combined selection of (i) the reward that is a value that is to be added to their consumer payment device; (ii) the transaction that is to be conducted with their consumer payment device; and (iii) the loyalty program points that are to be exchanged for the reward that the consumer has pre-selected. Prior to the selection, the consumer may receive an advertisement in the form of a webpage presentation of a plurality of the monetary loyalty program rewards that are currently being offered to participants in the loyalty program. Each such reward, upon selection, is exchangeable for a respective quantity of the loyalty program points debited to the account. Again, however, the reward will not be credited to the account until the consumer uses their consumer payment device to conduct the qualifying transaction that they have pre-selected at the Internet website or at some alternative communication channel such as by telephone.

Figure 3:
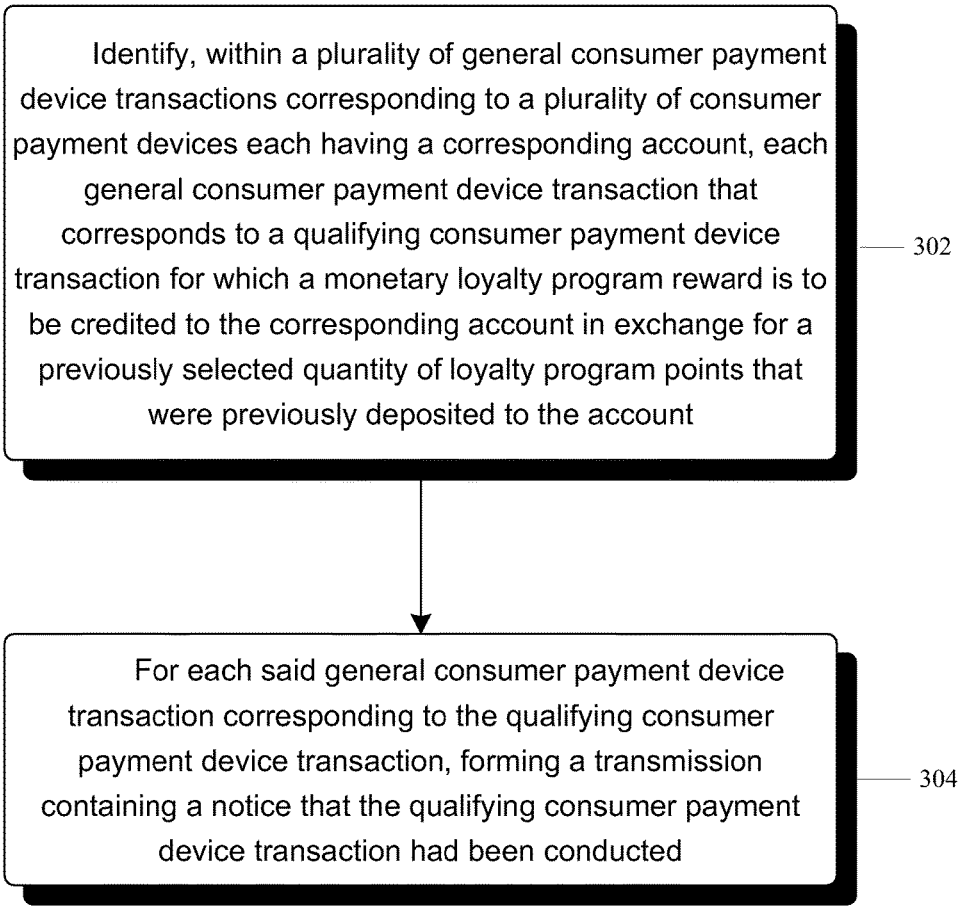
FIG. 3 is a flowchart illustrating an exemplary method of identifying transactions pre-selected and conducted by participants in a loyalty program for which are consumer pre-selected rewards are be given.

FIG. 3 is a flowchart of an exemplary method 300 by which a provider of a loyalty program can ensure that its participants will be rewarded for their participation via handling and processing of consumer transactions. In particularly, at step 302, there is identified, within a plurality of general consumer payment device transactions corresponding to a plurality of consumer payment devices each having a corresponding account, each general consumer payment device transaction that corresponds to a qualifying consumer payment device transaction for which a monetary loyalty program reward is to be credited to the corresponding account in exchange for a previously selected quantity of loyalty program points that were previously debited to the account.

After each general consumer payment device transaction corresponding to the qualifying consumer payment device transaction has been identified, and for each such transaction that has been so identified, a transmission is formed at step 304 of method 300. The transmission will preferably contain a notice that the qualifying transaction with the consumer payment device had been conducted. This transmission, and the notice therein, are further processed to result in a reward to the consumer for conducting their pre-selected transaction as so to receive back a pre-selected reward.

The rewards presented to the consumer for selection at the website can be, for instance, a plurality of qualifying transactions that correspond to a particular category of goods or services. In one implementation, the consumer may be offered a higher reward for selecting goods of a particular brand than the same goods of a different brand. As shown in FIG. 4 at step 402, the merchant or manufacturer may pre-arrange for their brand of goods or services to have the higher reward and/or lower points cost to the consumer by making a pre-arrangement with the loyalty program provider. Such an arrangement might be made, for instance, by compensating the loyalty program provider for the difference, in effect by 'buying down' the points cost to the consumer. As such, merchants can thereby distinguish themselves, their goods, and their services to participants in the loyalty program by offering a better deal than that of the goods and services of other merchants.

Figure 5:
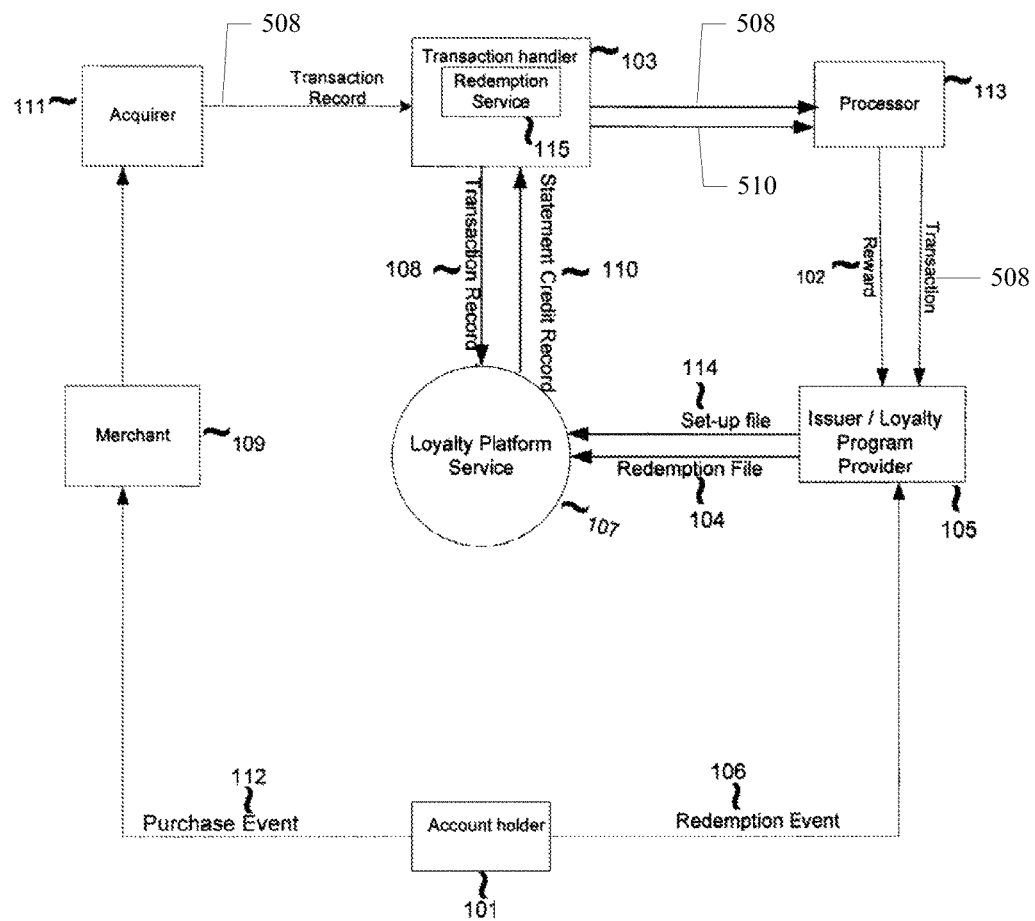
FIG. 5 illustrates an exemplary payment system in which a transaction is conducted by an account holder with a merchant, where the transaction is evaluated as to whether a loyalty program reward is to be provided to the account holder, where the merchant communicates the transaction to an acquirer who communicates with a processor for the transaction, where an issuer issues a consumer payment device to the account holder by which the transaction is conducted, and where the issuer seeks payment from the account holder for the transaction.

The above described loyalty program may be further implemented in a variety of ways. One such implementation can include a payment system. One example of a loyalty program that is implemented in a payment system is illustrated by a system 500 seen in FIG. 5. In FIG. 5, a consumer is an account holder 101. The account holder 101 pre-selects a reward that is to be a statement credit back to their account. This reward is realized through the cooperation of a merchant 109 with whom the account holder 101 conducted their pre-selected transaction using their consumer purchase device. Here, the merchant 109 communicates the transaction to a transaction handler 103 for further communication to an issuer 105 of the account of the account holder 101 and its corresponding consumer payment device. The issuer 105 can then seek payment for the pre-selected transaction from the account holder 101. Stated otherwise, the issuer 105 issues the consumer payment device associated with the account to the account holder 101 to conduct the transaction with the merchant 109. The merchant 109, in turn, communicates the consumer's transaction to an acquirer 111. The acquirer 111 then communicates one or more such consumer transactions to the transaction handler 103 who can communicate these to the respective issuers 105. Each of the issuers 105 can then communicates the consumer transactions to the respective account holders 101 for payment.

The issuer 105 and/or the transaction handler 103 defines a business rule for a purchase event 112 (e.g.; a transaction) by the account holder 101. Upon a redemption event 106 associated with the purchase event 112, the issuer 105 provides a redemption file 104 to the transaction handler 103, where the redemption file 104 includes information to identify an account of the account holder 101 and the reward 102 associated with the purchase event 112. The transaction handler 103 determines the reward 102 associated with the redemption event 106 and sends the reward 102 to the issuer 105 for providing to the account of the account holder 101. Based on the reward 102 provided to the account, and recalling the previous selections made by the account holder 101, the account holder 101 is capable of associating the reward 102 with their use of their consumer purchase device.

The transaction handler 103 includes a redemption service 115, where the redemption service 115 facilitates the fulfillment of the reward 102 for the account holder 101. The redemption service 115 calculates, authorizes, and/or fulfills the reward 102 for the account holder 101. For example, the reward 102 can be a discount or credit added to the account of the account holder 101. The issuer 105 identifies the account holder 101 to the transaction handler 103. At least one of the transaction handler 103 and the issuer 105 define a business rule for the purchase event 112 (such as a purchase of a good or service by the account holder 101). The issuer 105 can be an issuer bank and the purchase event 112 can be the cardholder making a purchase using a token (for instance a payment card or other consumer purchase device). For example, a business rule could include the account holder 101 purchasing $50 of gas to acquire 100 points in a loyalty program. The issuer 105 contracts with the transaction handler 103 for using the redemption service 115 and for identifying the account holder 101 to the transaction handler 103. In the example of a bank, the identification of the account holder 101 includes the issuer 105 using one or more of Bank Identification Numbers (BINs), ranges, or account numbers participating in the loyalty program to identify the account holder 101 to the transaction handler 103.

The issuer 105 also communicates with the transaction handler 103 to define the reward levels, reward codes, promotion type, description fields, Stock Keeping Unit (SKU) level information of products or services, corresponding statement credit amounts, length of time the reward 102 is valid, which entity pays for the reward 102 or discount, terms of redemption of the reward 102 or discount, and other business rules which might apply. The issuer 105 typically provides this information associated with such business rules to the transaction handler 103 in the form of a set-up file 114 (see FIG. 5). The issuer 105 defines one or more business rules for a transaction using the set-up file 114. The set-up file 114 may vary from issuer to issuer, acquirer to acquirer, or merchant to merchant, and can be revised periodically (such as annually, monthly, or otherwise). Based on the interface between the issuer 105 and the transaction handler 103, one or more new or revised business rules in the set-up file 114 can be incorporated into a statement of the account holder 101 via a message alert, thereby allowing the account holder 101 to use the most up-to-date benefits and features of a loyalty program provider 105.

Upon the redemption event 106 associated with the at least one business rule (such as by the account holder 101), the issuer 105 sends the redemption file 104 to the transaction handler 103. The loyalty program provider 105 (on behalf of the issuer 105) could also send the redemption file 104 to the transaction handler 103. The redemption file 104 includes information to identify an account of the account holder 101 and the reward 102 associated with the redemption event 106. The redemption event 106 can be using points from a loyalty program to get a discount and the redemption service 115 can be a redemption credit service. For example, the redemption file 104 includes at least one of an account number of the account holder 101 associated with the transaction handler 103, a credit card account number, a unique identifier, dates the reward is valid for, and a reward code (such as the type of reward the account holder 101 wants to redeem). The redemption event 106 can include or stem from any of the following events (or combinations) by the account holder 101: a purchase, a points redemption, a points transfer, or any other qualifying transaction.

The transaction handler 103 determines the reward 102 associated with the redemption event 106. The transaction handler 103 identifies a qualifying purchase for the redemption event 106 by using a transaction record 108 (associated with the qualifying purchase). The transaction record 108 can be a sale record for the qualifying purchase. In this example, the redemption file 104 can include information indicating that the account holder 101 is using 1000 points to redeem a $10 discount off of the $50 gas purchase. The transaction handler 103 sends the reward 102 to the issuer 105 for providing to the account of the account holder 101. For example, the transaction handler 103 sends a corresponding statement credit record 110 to the issuer 105 for posting to an account of the account holder 101. As such, the $10 discount will be displayed as a credit on the account of the account holder 101.

One or more rewards 102 (such as statement credits) are delivered through the transaction handler 103 to the issuer 105 and the account holder 101. The transaction handler 103 can include a loyalty platform service 107 or be separate from the loyalty platform service 107. The loyalty platform service 107 can be configured to provide one or more monetary statement credits, which are associated with one or more particular corresponding transactions. For example, a card issuer (who operates a rewards program) contracts with the transaction handler 103 to provide a cash back reward redemption option to a participant (such as the account holder 101) in the loyalty or rewards program. The account holder 101 chooses to redeem a specified number of points or miles (or other quantifiable item) through the loyalty or rewards program. Such a redemption event 106 gives the reward 102 to the account holder 101 (such as an amount off of the next particular purchase associated with a corresponding transaction by the account holder 101).

The loyalty platform service 107 helps the loyalty program provider 105 to facilitate the loyalty program. A loyalty cardholder (such as the account holder 101) could redeem points or miles in a loyalty program for statement credits on current or future transactions (such as on the card account associated with the loyalty program). Such a loyalty cardholder may select the type of loyalty program to participate in. The loyalty platform service 107 may interface with the transaction handler 103, the account holder 101, the merchant 109, an acquirer 111, the loyalty program provider 105, and the issuer 105 in connection with the transaction. For example, the loyalty platform service 107 could be Bank of America® bank interfacing with the loyalty program provider 105 (such as UNITED® airlines) to transact a loyalty program for the account holder 101.

The loyalty platform service 107 that rewards the consumer for using their consumer purchase device (for instance, their credit card) based on a transaction qualification and calculation mechanism is available to the loyalty program provider 105 (enabling a new reward fulfillment option). Although a loyalty program provider 105 is illustrated as associated with the issuer 105 in FIG. 5, each may also be separate and unassociated.

The loyalty platform service 107 associated with the transaction handler 103 identifies the next qualifying transaction (such as the purchase event 112) by the transaction record 108 (such as a sale record). The transaction record 108 triggers the type of reward 102 (such as a statement credit) offered to the account holder 101. For example, the transaction record 108 can identify the type of loyalty program account holder 101 (such as a cardholder) participates in, the reward 102 or discount, the business rule(s) associated with the particular transaction, and the duration of the reward 102 or discount. The transaction record 108 includes at least one of a sale record, a sale return record, a lease record, a credit record, a loyalty program record, and a redemption record, and the qualifying transaction includes at least one of an account holder purchase event and an account holder redemption event.

The loyalty platform service 107 associated with the transaction handler 103 sends a corresponding statement credit record 110 to the issuer 105 or the transaction handler 103 (such as a statement credit record 110 from processor 113 to the issuer 105 in FIG. 5) for posting to an account of the account holder 101. The corresponding statement credit record 110 identifies the particular location of the merchant 109, chain of the merchant 109, or category or industry of merchant(s) 109. The corresponding statement credit record 110 can include one or more identifiers of the merchant 109 (or other loyalty program participant). Merchant(s) 109 can have unique identifiers, for example a unique code assigned to the particular merchant 109. When a transaction occurs, such a unique identifier can populate one or more fields within the corresponding statement credit record 110 or related information. For example, the unique identifier for the particular merchant 109 can populate a field within the corresponding statement credit record 110. The transaction handler 103 can use the unique identifier from the corresponding statement credit record 110 to identify the merchant 109. The transaction handler 103 can use the unique identifier to implement the corresponding statement credit record 110 (while tying back the reward 102 to the particular merchant 109). Once the particular merchant 109 can be identified, the transaction handler 103 can identify the merchant 109 to the issuer 105. The issuer 105 can use the statement credit record 110 to give the reward 102 to the account holder 101. Such a reward 102 can be a statement credit corresponding to the particular merchant 109, because the loyalty program provider can identify the particular merchant 109.

Examples of Specific Reward Redemption Events in a Payment System

In one example, "HD hardware store" has a HD hardware store loyalty program in connection with the issuer 105. HD hardware store may have two franchisee merchants "HD hardware store X" and "HD hardware store Y" each having different acquirers. Acquirer X may keep an internal log on franchisee merchant HD hardware store X with an identifier "9999." Acquirer Y may keep a separate internal log on HD hardware store Y with an identifier "WQ83." The issuer 105 involved in the HD hardware store loyalty program may not be able to recognize the common element between HD hardware store X and HD hardware store Y via the internal identifiers of acquirer X "9999" or acquirer Y "WQ83", because the internal identifiers are different. Even though each of HD hardware store X and HD hardware store Y are franchisees of the franchisor HD hardware store, because their internal identifiers are different, no connection between the franchisees is made. Consequently, the issuer 105 may have difficulty determining if a purchase at each store would qualify for the HD hardware store loyalty program (from the franchisor). On the other hand, if HD hardware store's franchisees are each assigned unique identifiers, which may not be reliant on acquirer X's internal identifier or acquirer Y's internal identifier, the issuer 105 may be able to better distinguish HD hardware store X or HD hardware store Y as participants of the HD hardware store loyalty program.

Accordingly, the transaction handler 103 can use the unique identifier to distinguish or identify the merchant 109. In the example described, the transaction handler 103 may use information about the identity or distinction of HD hardware store X or HD hardware store Y to prepare the statement credit record 110 (while allowing issuer 105 to tie back the reward 102 to the particular merchant 109, so that the account holder 101 would also tie back the reward 102 to the particular merchant 109). Moreover, the transaction handler 103 may determine if HD hardware store X or a purchase at HD hardware store X qualify for the HD hardware store loyalty program, then apply the business rule for the HD hardware store loyalty program and calculate any applicable fulfillment. The transaction handler 103 may report any portion of the transaction handler's 103 analysis on HD hardware store back to the issuer 105 or the transaction handler 103 may keep records on HD hardware store X.

When the account holder 101 makes a transaction using a token (such as a particular card associated with the transaction handler 103), then a statement of the account holder 101 identifies the transaction and the reward 102 associated with the transaction (such as a corresponding statement credit). The transaction handler 103 gives the reward 102 to the account holder 101 in a way that the reward 102 could be redeemed at a particular location of the merchant 109, the merchant chain, or category or industry of merchants. For example, the account holder 101 redeems 10,000 points with a particular transaction handler 103 and gets a $10 statement credit after the next gasoline purchase.

Given the foregoing, the reward 102 can be posted to an account of the account holder 101, where the reward 102 identifies at least one of the transaction and the corresponding statement credit associated with the transaction. By tailoring the reward 102, the account holder 101 can associate the reward 102 with the transaction handler 103, the issuer 105, and/or the merchant 109. The account holder 101 can tie back the particular reward 102 to the particular transaction handler 103, issuer 105, or merchant 109. Therefore, the system 100 facilitates evaluation of the transaction, so that the reward 102 can be tailored toward the account holder 101 and the account holder 101 receives a substantially maximum reward.

In yet another example, a loyalty program associated with the transaction handler 103 may offer a $10 statement credit as the reward 102 on the account holder's 101 next gasoline purchase for 10,000 points (applied to any transaction at the merchant 109 in the gasoline industry). But the same $10 credit can be had for only 8,000 points on the next purchase at a CHEVRON® gasoline station. In this example, the merchant 109 (such as the CHEVRON® gasoline station) and the transaction handler 103 would enter into an agreement whereby the CHEVRON® gasoline station would "buy down" the reward point level (i.e., pay the loyalty program provider 105 for the 2,000 points) to the account holder 101 in exchange for the benefit of a future transaction from the account holder 101. The loyalty program provider 105 can offer an additional benefit to the CHEVRON® gasoline station by highlighting their reward option in a catalog, advertisement, or other marketing material. The transaction handler 103 could keep a portion of the revenue received from the merchant 109 (the 2,000 point buy down) and pass some amount back to the issuer 105 (such as a card issuing bank).

Of course, other types and categories of merchants and the kinds of goods and/or services they provide could all participate in a loyalty program reward, where the program could be applied broadly to a number of standard merchant categories (such as using a merchant category code, unique identifier, or specific code). See, for instance, the examples illustrated by the following Table in which each row shows a reward, and one of a standard redemption requirement or a merchant (or merchant category or industry) specific option.

TABLE

| Reward | Standard Redemption Requirement | Merchant Specific Option |
| --- | --- | --- |
| $10 off next gas purchase (at all merchants with a gas membership | 10,000 points | |
| $10 off next CHEVRON gasoline station purchase | | 8,000 points |
| $15 off next purchase of airline ticket of $300 or more (at all member airlines) | 20,000 points | |
| $15 off next UNITED AIRLINES ticket purchase of $300 or more | | 17,500 points |
| $10 off next restaurant purchase (at any merchant with a member restaurant) | 12,000 points | |
| $10 off next RED LOBSTER restaurant purchase | | 10,000 points |
| $100 off your next hotel stay of $500 or more (at any merchant with a member hotel) | 100,000 points | |
| $100 off your next MARRIOTT hotel stay | | 80,000 points |

Each option is an offering in connection with facilitating transaction evaluation for providing the reward 102 to the account holder 101 who benefits by selecting the particular merchant 109 (or merchant category or industry) in order to receive more of a reward for less points. A standard redemption requirement can be a number of points, an amount of money, any quantifiable amount, or a business rule associated with a loyalty program.

Figure 6:
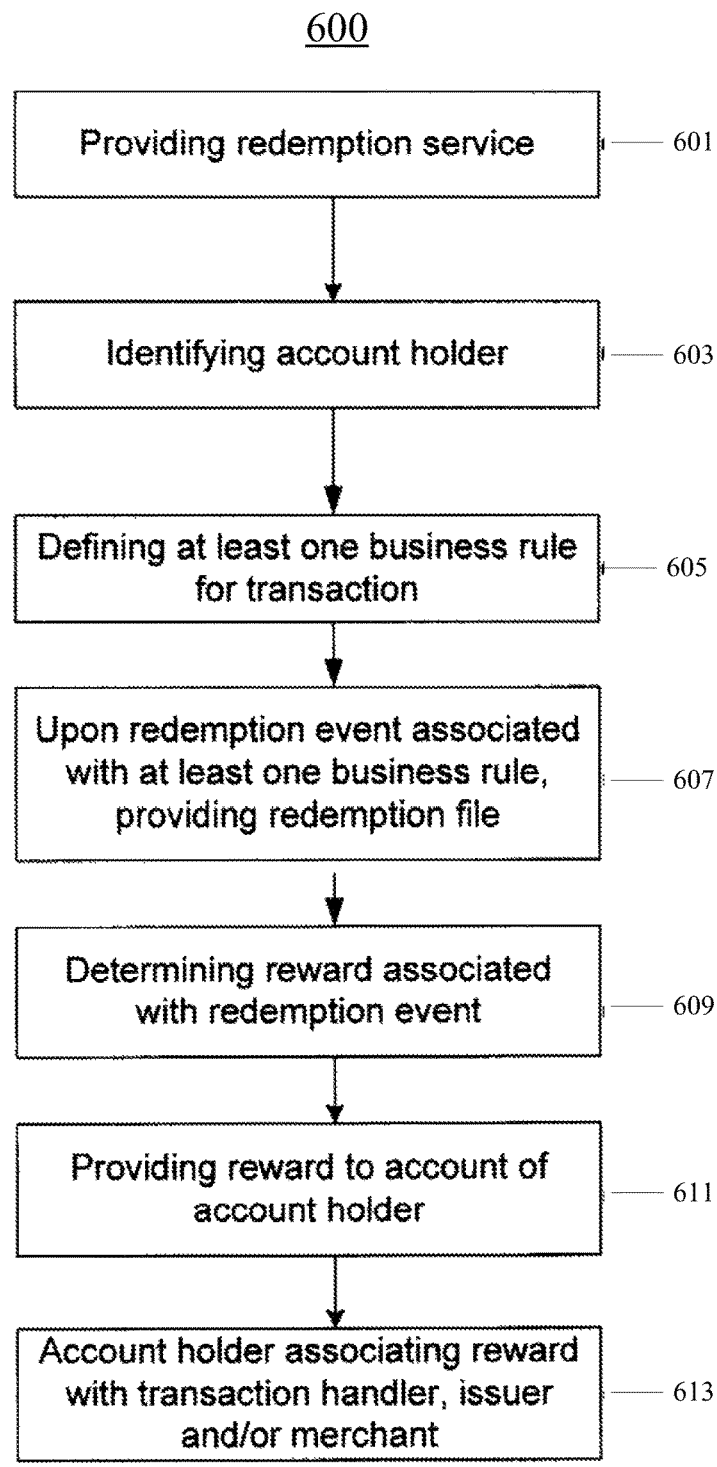
FIGS. 6-7 are flowcharts each illustrating still further exemplary methods for facilitating transaction evaluation for providing a reward to an account holder.
Figure 7:
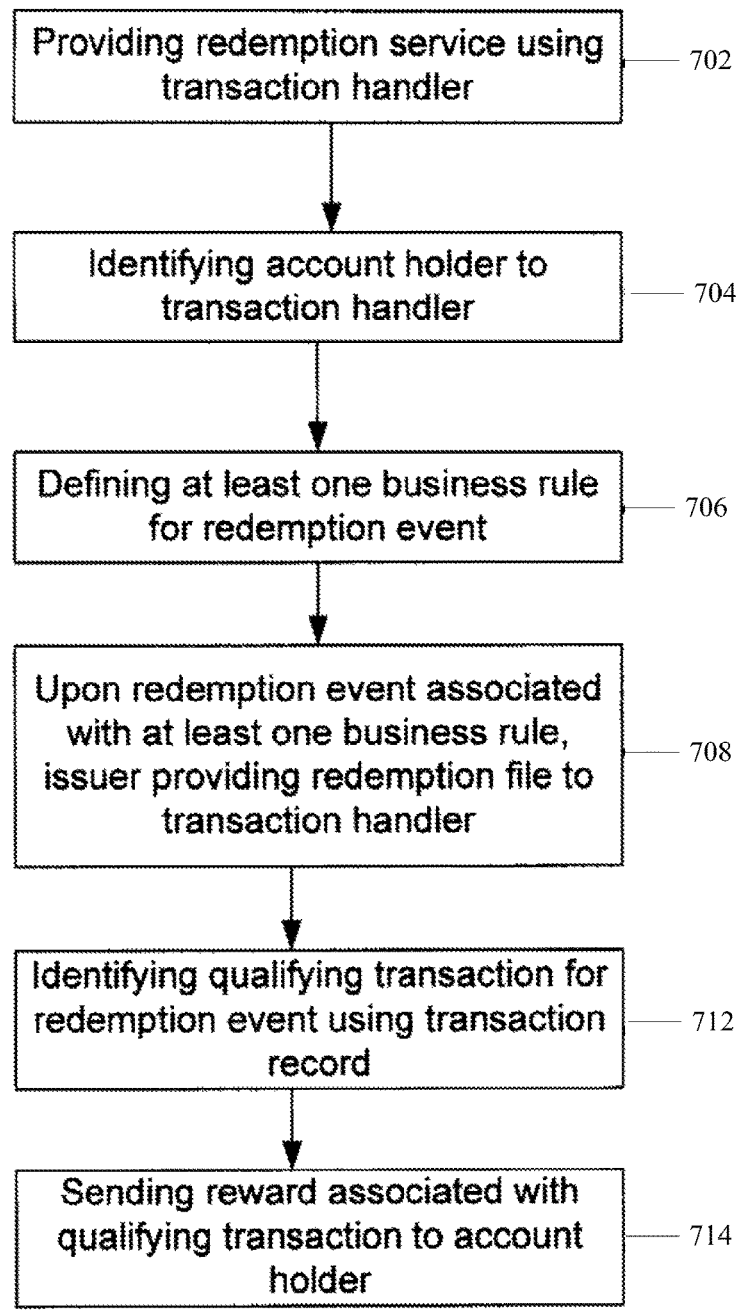

In reference to FIG. 5, FIGS. 6 and 7 are respective flowcharts each illustrating an exemplary method for facilitating transaction evaluation for providing the reward 102 to the account holder 101. A redemption service 115 is provided in step 201. For example, the transaction handler 103 can provide the redemption service 115 at step 302 to the account holder 101. The method also includes identifying the account holder 101 of an account (step 603). For example, the account holder 101 can be identified to the transaction handler 103 (step 704) by using an account number associated with the account holder 101. Defining at least one business rule for a transaction (step 605) can be, for example, at least one of the transaction handler 103 and the issuer 105 defining one or more business rules for the redemption event 106 (step 706). For example, the set-up file 114 with one or more revised business rules can be provided in a statement of the account holder 101 via a message alert. A business rule can be any rule associated with at least one of the transaction, the account holder 101, the issuer 105, the loyalty program provider 105, the processor 113, the transaction handler 103 including the redemption service 115, the loyalty platform service 107, the acquirer 111, and the merchant 109. For example, a business rule includes at least one of a reward level, reward code, promotion type, description field, SKU level information of product or service, corresponding statement credit amount, and length of time the reward is valid.

Upon the redemption event 106 associated with the one or more business rules, the redemption file 104 is provided (step 607). For example, the issuer 105 provides the redemption file 104 to the transaction handler 103 (step 708) including information to identify the account of the account holder 101 and the reward 102 associated with the redemption event 106. The redemption file 104 includes at least one of an account number of the account holder 101 associated with the transaction handler 103, a reward code, and one or more business rules.

The method includes determining the reward 102 associated with the redemption event 106 based on the information to identify the account of the account holder 101 and the reward 102 associated with the redemption event 106 (step 609). For example, the transaction handler 103 identifies a qualifying transaction for the redemption event 106 using the transaction record 108 (step 710). The transaction record 108 includes at least one of a sale record, a sale return record, a lease record, a credit record, a loyalty program record, and a redemption record, and the qualifying transaction includes at least one of the purchase event 112 and the redemption event 106.

The method also includes providing the reward 102 to the account of the account holder 101 (step 611). For example, the method includes providing the reward 102 associated with the qualifying transaction to the account holder 101 (step 712). Posting the reward 102 to the account of the account holder 101 can include identifying at least one of the transaction and a corresponding statement credit associated with the transaction (step 714). The reward 102 can include a statement credit for posting to the account of the account holder 101.

The reward 102 can be provided to the account of the account holder 101 in such a way that the account holder 101 is capable of associating the reward 102 with at least one of the transaction handler 103, issuer 105, and merchant 109 (step 613). By tailoring the reward 102 and the method for providing the reward 102 to the account holder 101, the reward 102 can thereby be associated with the transaction handler 103, the issuer 105, and/or the merchant 109.

A reward fulfillment solution will preferably be implemented so as to require account holder(s) 101 to perform an additional transaction (such as make a gasoline purchase), which will provide the issuer 105 with additional revenue. To be most effective, the implementation of the loyalty program will ensure that account holder(s) 101 will readily associate the value of the redemption event 106 with their particular card (for instance their credit card, debit card, stored value card, and the like) which may be perceived as delivering the value to the account holder 101 (which will reinforce account holder loyalty).

The loyalty program disclosed herein can have a less expensive implementation so as to realize lower reward fulfillment costs than that of traditional loyalty programs. In particular, traditional loyalty programs deliver rewards to consumers via gift cards or coupons. Gift cards and coupons, with the inherent overhead cost, can be an expensive reward to fulfill for loyal consumers. In contrast, it is comparably inexpensive to debit the account of an account holder with a consumer selected reward in return for a consumer selected transaction by the consumer's use of their consumer purchase device that is associated with the consumer's account.

By providing flexibility in some implementations of a loyalty program, the transaction handler 103 can provide incremental benefit to all participants. The account holder 101 can be benefited by redeeming fewer points for a specific cash back option offered by a merchant that "bought down" the required points (See FIG. 4 and its discussion above) than had the account holder 101 opted to receive the same cash back value across a set of similar merchant(s) 109. Merchant(s) 109, by virtue of "buying down" points, would have the opportunity to differentiate themselves from other merchants in the same category and thereby position themselves as part of the reward redemption process, with a result of gaining the loyalty of the account holder 101. Merchants might also have an added incentive for being an early adopter of a loyalty program, thereby differentiating themselves to account holders. Moreover, these merchant(s) 109, via the loyalty rewards they are offering, also benefit by ensuring they receive an incremental transaction (e.g.; more business) from the account holder 101. The issuer 105 (such as a card issuer) benefits by enjoying a further reduced cost of cash-back reward fulfillment, and may also receive the benefit of a portion of merchant's 109 "buy down" payment from the transaction handler 103. The transaction handler 103 benefits by deriving some incremental revenue from the delivery of this enhancement to the loyalty platform service 107.

Although known to and readily understood by those of ordinary skill in payment systems, but by way of background, a typical transaction conducted in a payment system may also include the participation of a transaction handler, an acquirer, and an issuer who issues the consumer payment device to the account holder. In a typical transaction, the account holder presents an account identifier, such as a number on a card or the card itself, to the merchant in connection with the transaction. A transaction can involve purchasing goods or services or the redemption of loyalty incentives. The issuer may authorize the transaction amount using the transaction handler. The transaction handler may also clear the transaction. Authorization includes the issuer, or the transaction handler on behalf of the issuer, authorizing the transaction amount in connection with the issuer's instructions such as through the use of business rules. The business rules could also includes instructions or guidelines from the transaction handler, account holder, merchant, acquirer, issuer, or financial institution or combination thereof. The transaction handler may maintain a log of authorized transactions. Once approved, the merchant will record the authorization, allowing the account holder to receive the good or service.

The merchant may (at discrete periods, such as the end of the day) submit a list of authorized transactions to the acquirer or transaction handler. The transaction handler may compare the submitted authorized transaction list with its own log of authorized transactions. If a match is found, the transaction handler may route authorization transaction amount requests from the corresponding acquirers to the corresponding issuers involved in each transaction. Once the acquirer receives the payment of the authorized transaction amount from the issuer, it can forward the payment to the merchant less any transaction costs, such as fees. If the transaction involves a consumer payment device such as debit or pre-paid card, the acquirer may choose not to wait for the initial payment prior to paying the merchant. There can be a merchant discount associated with the transaction.

There may be intermittent steps in the transaction process, some of which may occur simultaneously. For example, the acquirer can initiate the clearing and settling process, which can result in payment to the acquirer for the amount of the transaction. The acquirer may request (from the transaction handler) that the transaction be cleared and settled. Clearing includes the exchange of financial information between the issuer and the acquirer and settlement includes the exchange of funds. The transaction handler can provide services in connection with settlement of the transaction. The settlement of a transaction includes depositing an amount of the transaction settlement from a settlement house, such as a settlement bank, that the transaction handler typically chooses, into a clearinghouse, such as a clearing bank, that the acquirer typically chooses. The issuer deposits the same from a clearinghouse, such as a clearing bank, that the issuer typically chooses into the settlement house. Thus, a typical transaction involves various entities to request, authorize, and fulfill processing the transaction.

Various terms may be used herein, including the following:

Acceptance point device includes a device capable of communicating with a token including a point of sale (POS) device, cellular phone, personal digital assistant (PDA), personal computer (PC), tablet PC, handheld specialized reader, set-top box, electronic cash register (ECR), automated teller machine (ATM), virtual cash register (VCR), kiosk, security system, or access system;

Account holder or user includes any person or entity with an account and/or a token;

Issuer includes any entity that issues one or more accounts and/or tokens;

Merchant includes any entity that supports an acceptance point device;

Participant includes any user, person, entity, charitable organization, machine, hardware, software, merchant or business who accesses and uses the system of the invention, such as any consumer (such as primary member and supplementary member of an aggregate consumer account), retailer, manufacturer, and third-party provider, and any subset, group or combination thereof;

Redemption includes obtaining a reward using any portion of points, coupons, cash, foreign currency, gift, negotiable instruments, or securities;

Reward includes any discount, credit, good, service, package, event, experience (such as wine tasting, dining, travel), or any other item; and Token or consumer purchase device includes a card, smartcard, ordinary credit or debit cards (with a magnetic strip and without a microprocessor), a keychain device (such as the SPEEDPASS™ commercially available from Exxon-Mobil Corporation), cellular phone, personal digital assistant (PDA), pager, payment card, security card, access card, smart media, or transponder, where each token can include a loyalty module with a computer chip with dedicated hardware, software, embedded software, or any combination thereof that is used to perform actions associated with a loyalty program.

Implementations may be embodied as one or more of a method, a system, a device, and a computer program; where each method, system, device, and a computer program can include software and/or hardware components. Implementations are described using block diagrams and flowcharts to illustrate means for performing the described functions of the method, system, device, and computer program. The computer program can include a computer-readable storage medium having computer-readable program code means embodied in the storage medium. The system can include a host system including a processor for processing data, a memory in communication with the processor for storing the data, an input digitizer in communication with the memory and the processor for inputting the data into the memory; and an application program stored in the memory and accessible by the processor for directing processing of the data by the processor. The application program can be configured to perform a method. The system can include various integrated circuit components, such as microprocessors, controllers, memory elements, processing elements, logic elements, and look-up tables.

The steps of a method, process, or algorithm described in connection with the implementations disclosed herein may be embodied directly in hardware, in a software module executed by a processor, or in a combination of the two. The various steps or acts in a method or process may be performed in the order shown or may be performed in another order. Additionally, one or more process steps may be omitted or one or more process steps may be added to the processes. An additional step, block, or action may be added in the beginning, end, or intervening existing elements of such processes.

The above description of the disclosed embodiments is provided to enable any person of ordinary skill in the art to make or use the disclosure. Various modifications to these embodiments will be readily apparent to those of ordinary skill in the art, and the generic principles defined herein may be applied to other embodiments without departing from the spirit or scope of the disclosure. Thus, the disclosure is not intended to be limited to the embodiments shown herein but is to be accorded the widest scope consistent with the principles and novel features disclosed herein.

What is claimed is:

1. A non-transitory machine readable medium storing instructions, which, when executed, cause a computing system to:

receive, by a loyalty platform computing device, from an issuer computing device, a set-up file, the loyalty platform computing device coupled to interact by communications with a transaction handler, the communications comprising transaction records provided by the transaction handler from processing of transactions for consumer payment devices in an electronic payment processing network, the network interconnecting issuer computing devices controlling consumer accounts from which payments are made and acquirer computing devices controlling merchant accounts to which the payments are made, and wherein a communication portal is coupled with the loyalty platform computing device and configured to communicate with computer devices outside the electronic payment processing network;

present, in response to the loyalty platform computing device instructing the communication portal to communicate with a computing device of a consumer, a plurality of reward options to the consumer in a user interface of a website, each reward option comprising a reward that is a value to be credited to an account of the consumer, a future qualifying transaction in which to use the reward, and an amount of a loyalty program currency to be exchanged for the reward upon conducting the future qualifying transaction, wherein the consumer has a balance of the loyalty program currency with a loyalty program provider, wherein the future qualifying transaction is a transaction with a first merchant within a predetermined category of merchants, and wherein a unique identifier corresponds to the first merchant;

prior to processing the future qualifying transaction, receive, by the communication portal, a selection in the user interface from the consumer of one of the reward options, the selection defining a selected reward;

after receiving the selection from the consumer, process, by the transaction handler, a plurality of transactions in the electronic payment processing network, the processing comprising receiving a transaction record from a first merchant computing device;

access, by the transaction handler, from a database, transaction records associated with the plurality of transactions, the records including a first transaction record;

in response to receiving the first transaction record from the transaction handler, identify, by the loyalty platform computing device, as controlled by the set-up file, using the first transaction record, a first transaction conducted by the consumer, with the first merchant computing device, that qualifies for the selected reward, wherein the transaction is conducted via a consumer payment device associated with the account of the consumer;

incorporate, in response to occurrence of the first transaction, by the loyalty platform computing device based on instructions received by the loyalty platform computing device from the issuer computing device, the unique identifier corresponding to the first merchant computing device into a field of a first statement credit record;

send, by the loyalty platform computing device to the transaction handler, statement credit records, including the first statement record, associated with corresponding transactions including the first transaction, the statement credit record identifying a location of the first merchant computing device;

in response to identifying the first transaction, send, by the loyalty platform computing device, at least one communication to the issuer computing device to debit the amount of the loyalty program currency from the balance of the loyalty program currency, and to credit the account of the consumer with the selected reward; and in response to identifying the first transaction, instruct, by the loyalty platform computing device, the communication portal to send, outside the electronic payment processing network, a communication to a computing device of the consumer, the communication causing the computing device of the consumer to display a notification that the conducted transaction with the consumer payment device qualifies for the selected reward, and that, based on the unique identifier, the selected reward is redeemable with the merchant within the predetermined category of merchants.

2. The non-transitory machine readable medium of claim 1, wherein the instructions further cause the computing system to:

apply a discount to a purchase price paid by the consumer at a point of service terminal at which the transaction is conducted.

3. The non-transitory machine readable medium of claim 2, wherein the reward is the discount.

4. The non-transitory machine readable medium of claim 1, wherein the future qualifying transaction is a transaction with a merchant within a predetermined category of merchants and is selected from the group consisting of:
 a transaction for a good within a predetermined category of goods;
 a transaction for a predetermined good;
 a transaction for a service within a predetermined category of services; and
 a transaction for a predetermined service.

5. The non-transitory machine readable medium of claim 1, wherein the transaction is conducted by the consumer with a participating merchant, and the future qualifying transaction is defined in conjunction with the participating merchant.

6. A method, comprising:
 receiving, by a loyalty platform computing device, from an issuer computing device, a set-up file, the loyalty platform computing device coupled to interact by communications with a transaction handler, the communications comprising transaction records provided by the transaction handler from processing of transactions for consumer payment devices in an electronic payment processing network, the network interconnecting issuer computing devices controlling consumer accounts from which payments are made and acquirer computing devices controlling merchant accounts to which the payments are made, and wherein a communication portal is coupled with the loyalty platform computing device and configured to communicate with computer devices outside the electronic payment processing network;

presenting, in response to the loyalty platform computing device instructing the communication portal to communicate with a computing device of a consumer, a plurality of reward options to the consumer in a user interface of a website, each reward option comprising a reward that is a value to be credited to an account of the consumer, a future qualifying transaction in which to use the reward, and an amount of a loyalty program currency to be exchanged for the reward upon conducting the future qualifying transaction, wherein the consumer has a balance of the loyalty program currency with a loyalty program provider, wherein the future qualifying transaction is a transaction with a first merchant within a predetermined category of merchants, and wherein a unique identifier corresponds to the first merchant;

prior to processing the future qualifying transaction, receiving, by the communication portal, a selection in the user interface from the consumer of one of the reward options, the selection defining a selected reward;

after receiving the selection from the consumer, processing, by the transaction handler, a plurality of transactions in the electronic payment processing network, the processing comprising receiving a transaction record from a first merchant computing device;

accessing, by the transaction handler, from a database, transaction records associated with the plurality of transactions, the records including a first transaction record;

in response to receiving the first transaction record from the transaction handler, identifying, by the loyalty platform computing device as controlled by the set-up file, using the first transaction record, a first transaction conducted by the consumer, with the first merchant computing device, that qualifies for the selected reward, wherein the transaction is conducted via a consumer payment device associated with the account of the consumer;

incorporating, in response to occurrence of the first transaction, by the loyalty platform computing device based on instructions received by the loyalty platform computing device from the issuer computing device, the unique identifier corresponding to the first merchant computing device into a field of a first statement credit record;

sending, by the loyalty platform computing device to the transaction handler, statement credit records, including the first statement record, associated with corresponding transactions including the first transaction, the statement credit record identifying a location of the first merchant computing device;

in response to identifying the first transaction, sending, by the loyalty platform computing device, at least one communication to the issuer computing device to debit the amount of the loyalty program currency from the balance of the loyalty program currency, and to credit the account of the consumer with the selected reward; and in response to identifying the first transaction, instructing, by the loyalty platform computing device, the communication portal to send, outside the electronic payment processing network, a communication to a computing device of the consumer, the communication causing the computing device of the consumer to display a notification that the conducted transaction with the consumer payment device qualifies for the selected reward, and that, based on the unique identifier, the selected reward is redeemable with the merchant within the predetermined category of merchants.

7. The method of claim 6, further comprising: providing the consumer a notice that the balance of the loyalty program currency is debited by the amount of the loyalty program currency.

8. The method of claim 7, further comprising:
providing, via a computing device, the consumer a notice that the selected reward was credited to the account of the consumer.

9. The method of claim 6, further comprising:
receiving, via a computing device, data corresponding to initiation of the conducted transaction from an acceptance point device.

10. The method of claim 6, wherein the transaction is conducted by the consumer with a participating merchant, and the future qualifying transaction is defined in conjunction with the participating merchant.

11. The method of claim 6, wherein the future qualifying transaction is a transaction with a merchant within a predetermined category of merchants and is selected from the group consisting of:
a transaction for a good within a predetermined category of goods;
a transaction for a predetermined good;
a transaction for a service within a predetermined category of services; and
a transaction for a predetermined service.

12. A system, comprising:
at least one processor; and
memory storing instructions configured to instruct the at least one processor to:

receive, by a loyalty platform computing device, from an issuer computing device, a set-up file, the loyalty platform computing device coupled to interact by communications with a transaction handler, the communications comprising transaction records provided by the transaction handler from processing of transactions for consumer payment devices in an electronic payment processing network, the network interconnecting issuer computing devices controlling consumer accounts from which payments are made and acquirer computing devices controlling merchant accounts to which the payments are made, and wherein a communication portal is coupled with the loyalty platform computing device and configured to communicate with computer devices outside the electronic payment processing network;

present, in response to the loyalty platform computing device instructing the communication portal to communicate with a computing device of a consumer, a plurality of reward options to the consumer in a user interface of a website, each reward option comprising a reward that is a value to be credited to an account of the consumer, a future qualifying transaction in which to use the reward, and an amount of a loyalty program currency to be exchanged for the reward upon conducting the future qualifying transaction, wherein the consumer has a balance of the loyalty program currency with a loyalty program provider, wherein the future qualifying transaction is a transaction with a first merchant within a predetermined category of merchants, and wherein a unique identifier corresponds to the first merchant;

prior to processing the future qualifying transaction, receive, by the communication portal, a selection in a user interface from the consumer of one of the reward options, the selection defining a selected reward;

after receiving the selection from the consumer, process, by the transaction handler, a plurality of transactions in the electronic payment processing network, the processing comprising receiving a transaction record from a first merchant computing device;

access, by the transaction handler, from a database, transaction records associated with the plurality of transactions, the records including a first transaction record;

in response to receiving the first transaction record from the transaction handler, identify, by the loyalty platform computing device, as controlled by the set-up file, using the first transaction record, a first transaction conducted by the consumer, with the first merchant computing device, that qualifies for the selected reward, wherein the transaction is conducted via a consumer payment device associated with the account of the consumer;

incorporate, in response to occurrence of the first transaction, by the loyalty platform computing device based on instructions received by the loyalty platform computing device from the issuer computing device, the unique identifier corresponding to the first merchant computing device into a field of a first statement credit record;

send, by the loyalty platform computing device to the transaction handler, statement credit records, including the first statement record, associated with corresponding transactions including the first transaction, the statement credit record identifying a location of the first merchant computing device;

in response to identifying the first transaction, send, by the loyalty platform computing device, at least one communication to the issuer computing device to debit the amount of the loyalty program currency from the balance of the loyalty program currency, and to credit the account of the consumer with the selected reward; and in response to identifying the first transaction, instruct, by the loyalty platform computing device, the communication portal to send, outside the electronic payment processing network, a communication to a computing device of the consumer, the communication causing the computing device of the consumer to display a notification that the conducted transaction with the consumer payment device qualifies for the selected reward, and that, based on the unique identifier, the selected reward is redeemable with the merchant within the predetermined category of merchants.

13. The system of claim 12, wherein the future qualifying transaction is a transaction with a merchant within a predetermined category of merchants and is selected from the group consisting of:

a transaction for a good within a predetermined category of goods;

a transaction for a predetermined good;

a transaction for a service within a predetermined category of services; and a transaction for a predetermined service.

* * * * *